Sept. 24, 1963           G. CAMAC           3,105,033
NUCLEAR REACTOR SHUTDOWN APPARATUS
Filed Nov. 12, 1959                                6 Sheets-Sheet 1
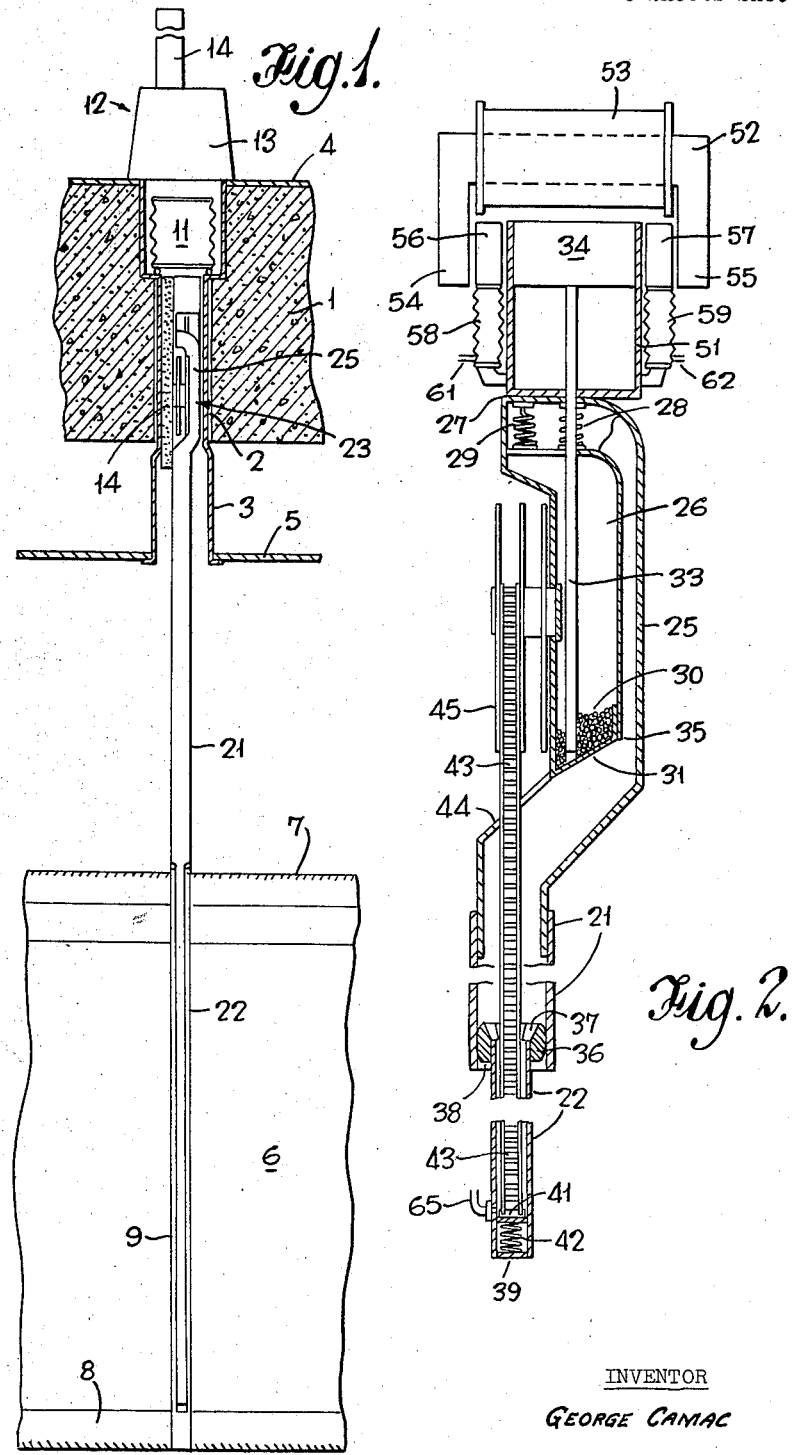
INVENTOR
GEORGE CAMAC
BY Lawson and Taylor

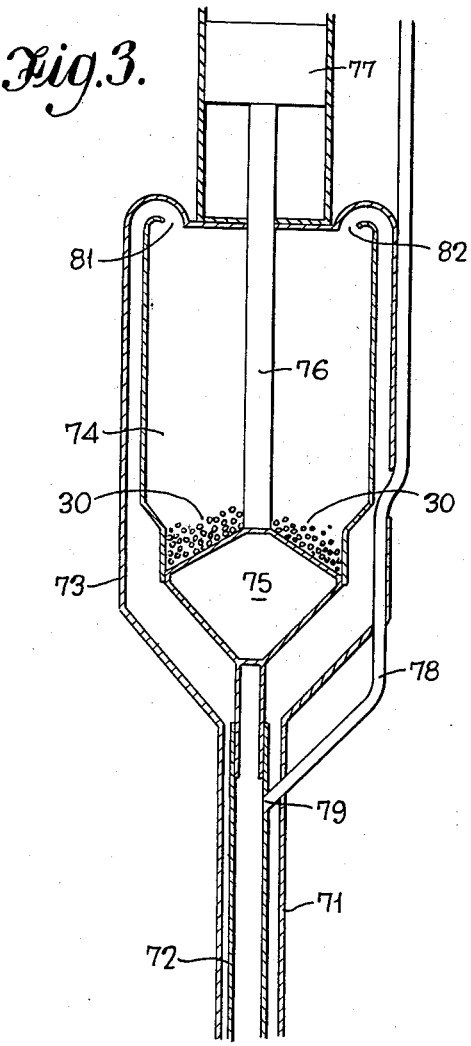

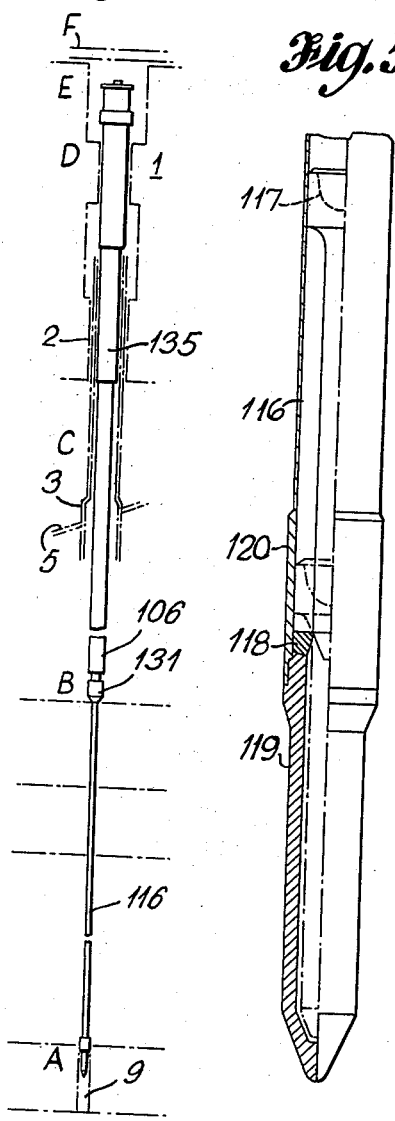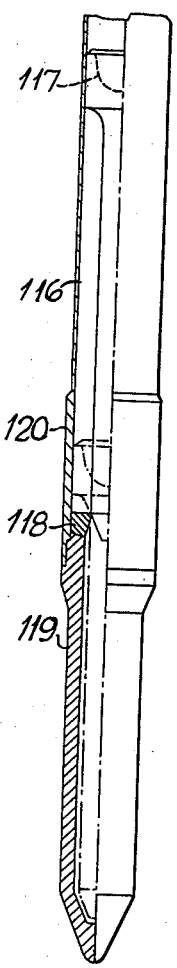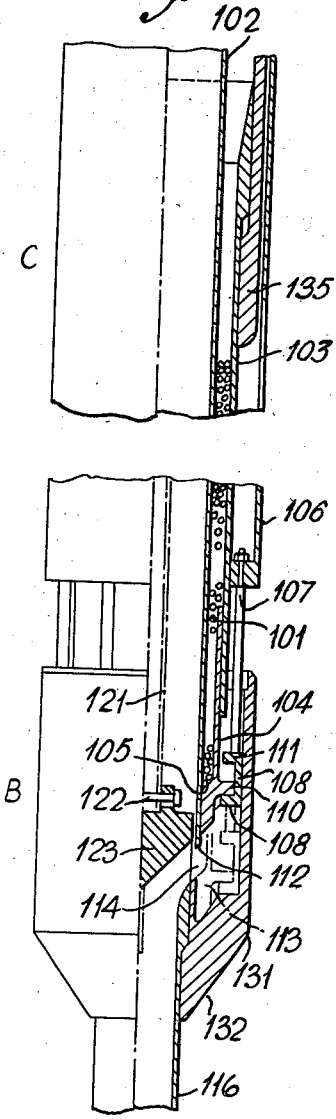

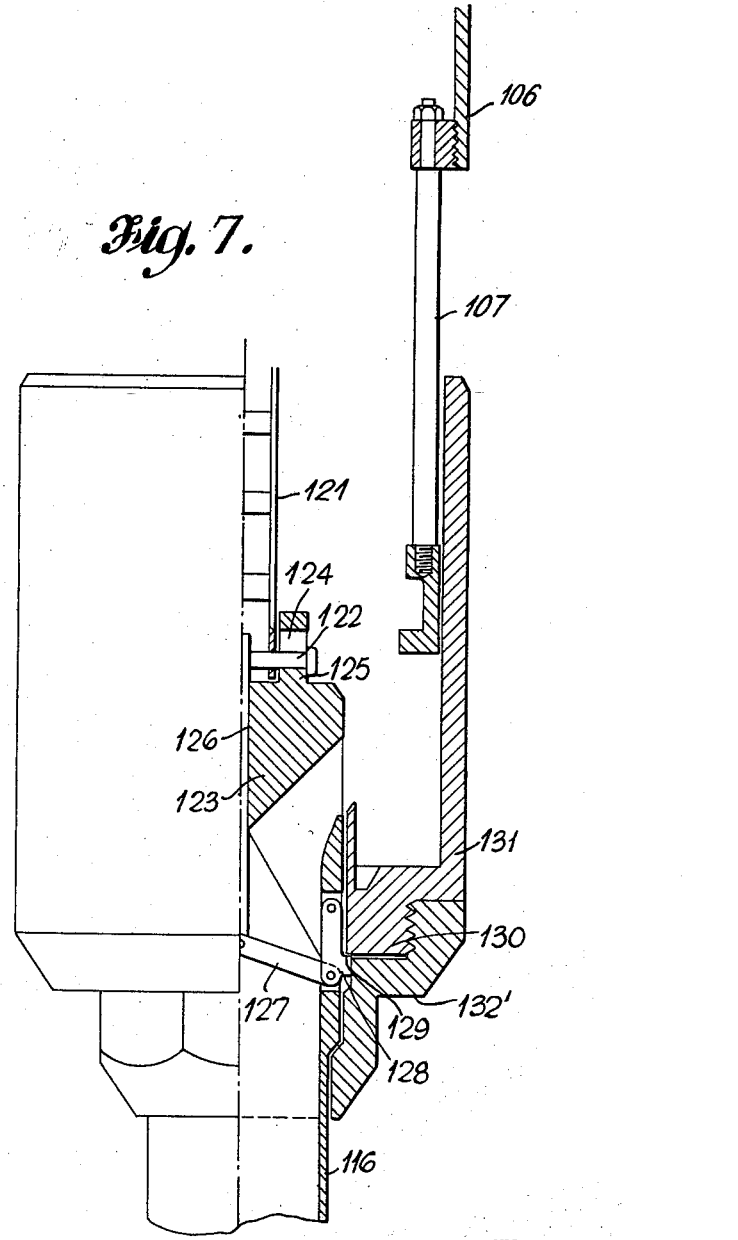

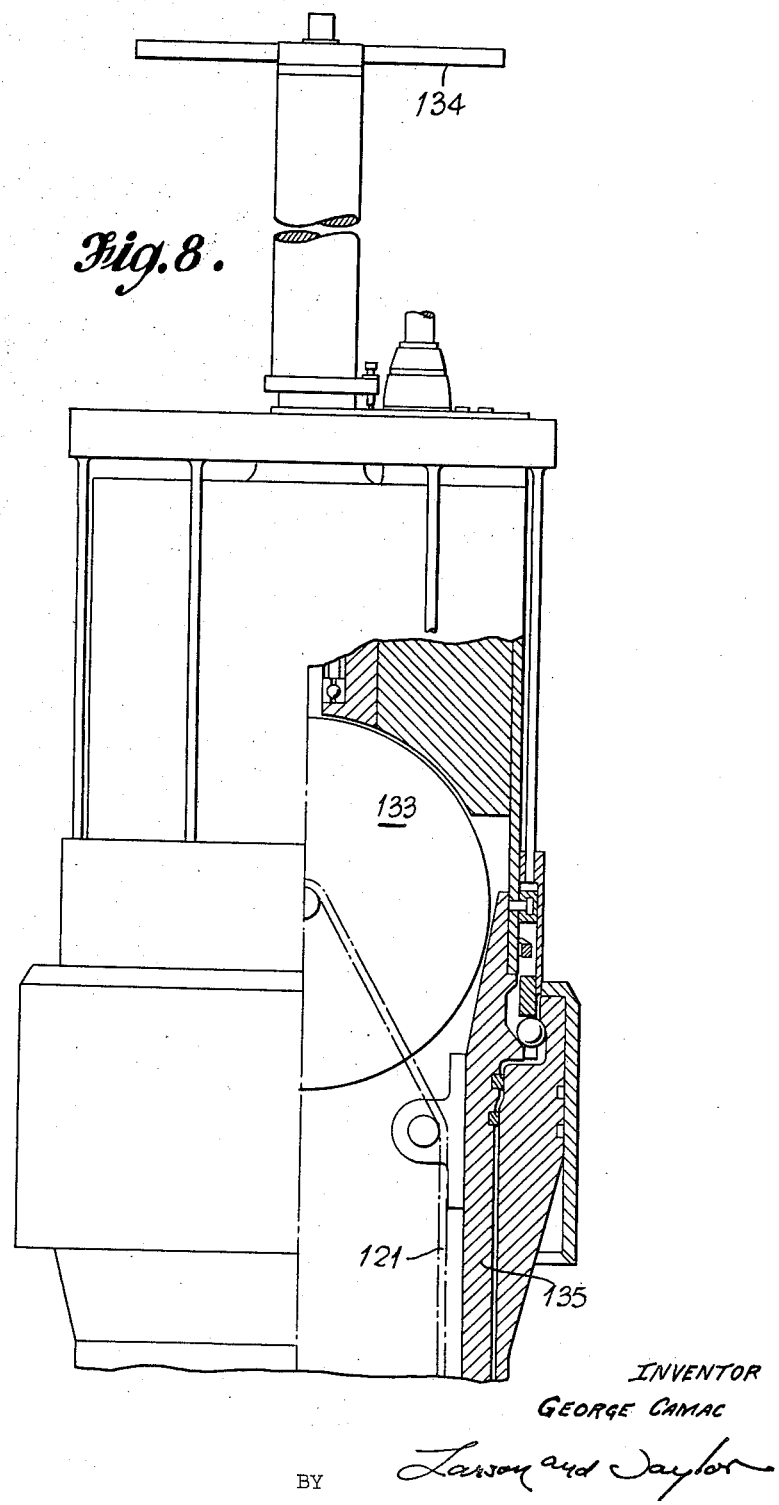

Sept. 24, 1963 G. CAMAC 3,105,033
NUCLEAR REACTOR SHUTDOWN APPARATUS
Filed Nov. 12, 1959 6 Sheets-Sheet 6
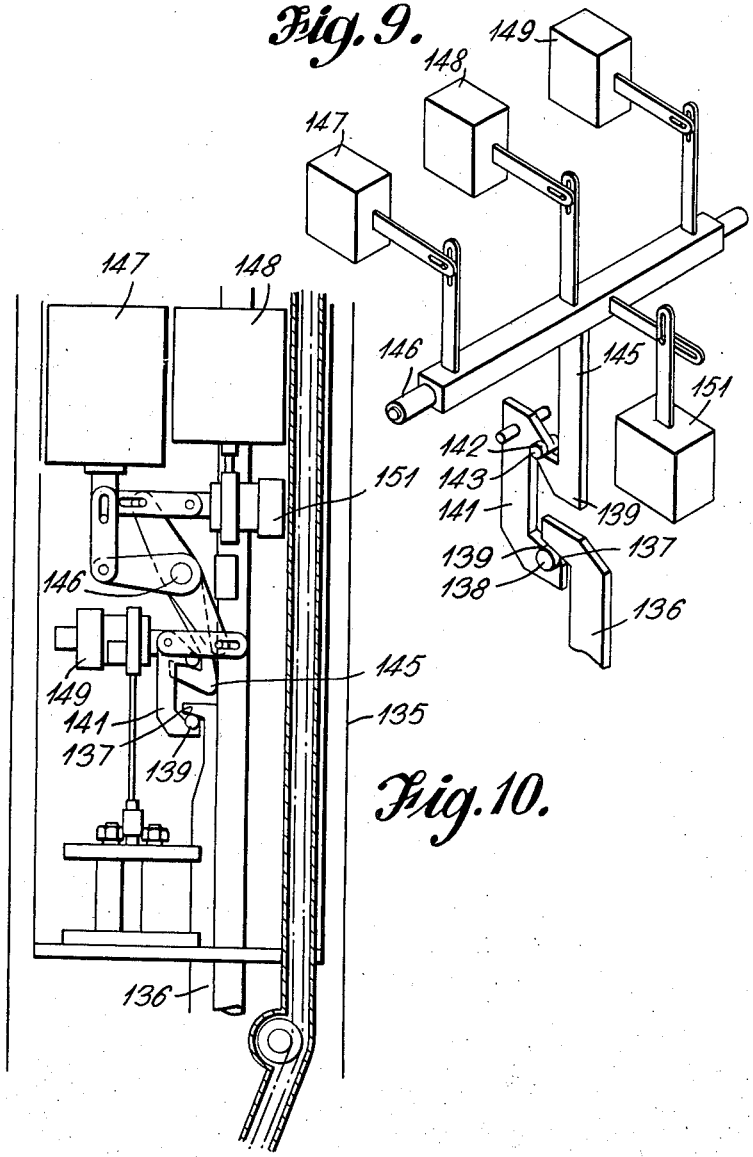
INVENTOR
GEORGE CAMAC
BY Lawson and Taylor United States Patent Office 3,105,033
Patented Sept. 24, 1963

3,105,033
NUCLEAR REACTOR SHUTDOWN
APPARATUS
George Camac, Mobberley, England, assignor to A.E.I.-
John Thompson Nuclear Energy Company Limited,
London, England, a company of Great Britain
Filed Nov. 12, 1959, Ser. No. 852,545
Claims priority, application Great Britain Nov. 14, 1958
1 Claim. (Cl. 204—193.2)

The present invention relates to nuclear reactors and in particular to methods and apparatus for rapidly shutting down the reactor when emergency conditions occur.

The invention has an important application in reactors having a graphite moderator, but is also applicable to other types of reactors, e.g. heavy or light water cooled reactors.

In a nuclear reactor of the type having a graphite core with a plurality of vertical channels in which are placed the fuel elements end to end and through which the cooling gas is caused to flow, it is normal practice to control the reactivity by inserting control rods, of neutron absorbent material, into the core. These rods are lowered into vertical channels within the core. By this method it is possible to control the reactivity within the reactor to a required level by varying the number and positions of the control rods within the core. In the event of the reactivity suddenly increasing and becoming out of control or in the event of other danger conditions occurring, all the control rods may be lowered rapidly into the core. This will have the effect of immediately lowering the reactivity to a safe level.

However, damage to the reactor may have occurred and this may result in the channels, down which the control rods are to pass, being deformed or blocked up. This will prevent the rods from falling freely into their shut down position and may prevent shut down of the reactor. Other damage or danger conditions may prevent the rods from being lowered.

The object of the present invention is to provide means for rapidly shutting down a nuclear reactor in the event of failure of normal control means and normal shutting down means.

According to the present invention apparatus for shutting down a nuclear reactor comprises a reservoir containing neutron absorbent material in a form having fluid properties located above the core of said reactor, ducting leading from said reservoir and extending within said core, means for allowing said neutron absorbent material to pass into said ducting within said core on the receipt of an operating signal, and means for subsequently removing said material from said core.

The term "having fluid properties" is taken to mean that the material is of such a form that it flows easily and smoothly along a suitably positioned duct.

The material may be in the form of pellets or small particles. The pellets may be balls and these may be made of stainless steel which includes a proportion of boron. The particles may be sand. Alternatively the balls may be of glass which includes a proportion of boron.

Preferably the portion of the ducting adapted to receive the neutron absorbent material may be removed from the core.

The ducting may comprise an upper tube and a lower tube adapted to fit within said upper tube, together with means for lowering said lower tube from within said upper tube so that it extends within the core of the reactor.

In order that the invention may be more readily understood reference will now be made to the accompanying drawings in which:

FIGURE 1 is a side view in section of part of the core of a nuclear reactor illustrating apparatus embodying the invention in its operational position;

FIGURE 2 is an enlarged view of part of the apparatus illustrated in FIG. 1;

FIGURE 3 is an enlarged view of part of a modified form of the apparatus illustrated in FIG. 1;

FIGURE 4 is a diagrammatic side view of apparatus embodying a modified form of the invention in the operational position;

FIGURE 5 is a detailed illustration at reference A in FIG. 4;

FIGURE 6 is a detailed illustration at reference B and C in FIG. 4;

FIGURE 7 is an enlarged illustration of part of FIG. 6;

FIGURE 8 is a detailed illustration at reference E of FIG. 4;

FIGURE 9 is a diagrammatic illustration of the tripping arrangement for the apparatus illustrated in FIG. 4, and FIGURE 10 is a detailed illustration at reference D of FIG. 4.

With reference of FIGURE 1 the biological shield 1 of the reactor is formed with one or more holes 2 through each of which a stand pipe 3 extends downward from the charging floor 4 to the top plate 5 of the pressure vessel. The core 6 of the reactor is located within the pressure vessel and extends between the top retaining plate 7 and the supporting diagrid 8. One or more holes 9 are formed in the core 6, each hole being located directly beneath one of said stand pipes and aligned therewith. The top of the stand pipe is closed with a flap valve 11 of any type well known in the art. This valve is controllable from outside the biological shield by a machine 12 located on the charging floor 4. The machine 12, which is also used to insert and withdraw the apparatus of the present invention is formed with a main body portion 13 and a vertically extending portion 14.

The apparatus of the invention consists of an upper tube 21 which extends from within the stand pipe 3 down to the top 7 of the core and a lower tube 22 which extends from the lower end 21 down through the hole 9 in the core 6. The respective diameters of the tubes 21, 22 are such that the lower tube 22 can be drawn up into the upper tube 21. The upper tube is conveniently made of mild steel and the lower tube is preferably made from a zirconium alloy. This limits the neutron absorption of the lower tube when it is within the core of the reactor and ensures that the lower tube is resilient and will withstand a certain amount of bending and shock. On the top of the upper tube is located loading apparatus 23 and also winding gear for drawing up the lower tube into the upper tube. The loading apparatus 23 and the winding gear are all located within the stand pipe 3 and are surrounded with a mass of shielding concrete 14.

FIG. 2 is an enlarged sectioned view of the loading apparatus 23 and winding gear located on top of the tube 21. The upper end of the tube 21 is joined to a duct 25 which encloses a hopper 26. The hopper 26 is supported from the top plate 27 of the duct 25 by resilient means such as springs 28, 29. The bottom of the hopper is closed by a plate 31 to the upper side of which is attached a rod 33 which extends upward through the hopper and is attached at its upper end to a weight 34. The weight 34 and the rod 33 are normally supported so that the plate 31 closes an aperture 35 in the bottom of the hopper. The hopper contains a large number of balls 30, which are preferably made of stainless steel with a boron content and of about ⅜" diameter. Alternatively, the balls may be made of glass with a boron content or may be in the form of sand, or, in combination with minor modifications to the apparatus, the hopper could contain liquid. It is in all cases most important that the neutron absorbent material contained in the hopper should be freely flowing.

The lower portion of FIG. 2 illustrates the joint between the tubes 21, 22 and also the lower end of tube 22. At the joint between the two tubes a ring 36 supports the top of the tube 22 and is formed with its upper surface 37 conical. The outside diameter of the ring 36 is substantially equal to the inside diameter of the tube 21. The lower edge 39 of the ring 36 is adapted to rest on the top 7 of the reactor core when the tube 22 is lowered into its position within the hole 9. The lower end of the tube 22 is closed by a plate 39. Above the plate 39 and fitting loosely in the tube 22 is a piston 41. The piston 41 is supported from the plate 39 by a spring 42. Two chains, only one of which 43 is shown in FIG. 2, are attached to the inside of the lower end of the tube 22. The chains extend up through both tubes 21, 22 and pass through an aperture 44 in the wall of the duct 25 and pass over a pulley 45. A driving shaft to rotate the pulley 45 passes from the loading apparatus 23 into the machine 12 and means are provided in the machine 12 for rotating the pulley 45. By rotating the pulley 45 the chains raise the lower tube 22 so that it passes into the upper tube 21 and is raised clear of the top 7 of the core. The chains also control the lowering of the lower tube.

The weight 34 at the upper end of the rod 33 is constrained to move vertically within a guide such as a cylinder 51 and is made of magnetic material. One method of supporting the weight is illustrated in FIG. 2. The U-shaped core 52 of a magnet is energised by a solenoid 53 and is formed with pole pieces 54, 55. Two soft iron blocks 56, 57 are located between the pole pieces and the weight 34. The blocks 56, 57 are respectively supported by two bellows 58, 59 which are respectively connected by two pipes 61, 62 to the supply of cooling gas within the reactor.

It is necessary to cause the steel balls 30 to fall down the tube 21 and into the lower tube 22 so that they fill up the lower tube and reduce the reactivity within the reactor, if the reactivity becomes uncontrollable or if some other undesirable condition arises, such as the breaking up of the core. Therefore the weight controlling mechanism must be such that it can be tripped by an electrical, a mechanical or a pressure sensitive means. The electrical supply to the solenoid can for instance be broken by an electrical circuit. The bellows 58, 59 are connected to the gas coolant within the reactor and will collapse if the pressure of the coolant drops below a certain predetermined value. Either of these two operations will cause the blocks 56, 57 to be moved downwards. The blocks can alternatively be moved by a mechanical linkage. The moving of the blocks 56, 57 from their positions between the pole pieces and the weight will interrupt the magnetic circuit and will cause the weight 34 to fall under its own weight. This will cause the rod 33 to move the plate 31 so as to open the aperture 35 and allow the balls 30 to fall down the tubes 21, 22. The weight 34 will fall on to the top plate 27 of the duct 25 and vibrate the hopper resulting in all the balls being dislodged from within the hopper.

The weight supporting mechanism may be tripped by any one of several occurrences. Firstly, relative movement between the stand pipe and the diagrid, over and above the movement which occurs when the core heats up, will take up the slack in the chains and operate the mechanical trip. Secondly, reduction in the gas coolant pressure within the core will operate the pressure trip. Thirdly, the overheating of a fuel element located at the top of one of the fuel element channels adjacent to the hole 9 will cause a thermocouple to operate the electrical trip. Fourthly, reduction in the pressure of the gas coolant outside the core will operate the pressure trip. Fifthly, a fault in the external electrical circuit will operate the electrical trip.

When the balls fall into the lower tube 22 the shock of their impact will be absorbed by the shock absorber formed by the piston 41 and the spring 42. When the balls are within the lower tube they fill this tube up to the level of the top of the graphite in the core and will absorb excess neutrons so as to reduce the reactivity in the reactor.

In order to prevent a sudden increase in the pressure drop across the reactor blowing the lower tube into the upper tube before the balls have fallen into the lower tube, a ratchet device is provided at the bottom of the upper tube. This prevents upward movement of the lower tube 22 unless it is pulled up by the chains.

In order to return the balls to the hopper 26 after they have been dropped into the lower tube and it is required to start up the reactor again, the lower tube 22 is retracted into the upper tube 21 by means of the chains and the two tubes and the loading apparatus are drawn up into the machine 12, the tubes being accommodated by the vertically extending portion 14. The control apparatus can thus be removed from the reactor and gas under pressure can be forced into the lower end of the lower end 22 through a non-return valve 65. The balls are pushed up the tubes through the ducts 25 and into the top of the hopper 26, the plate 31 having previously been placed in position so as to close the aperture 35.

An alternative method of returning the balls into the hopper is to raise the lower tube containing the balls so that its lower end is located above the hopper and then to open an aperture in the bottom of the tube and drop the balls directly into the hopper. A disadvantage of this method is that the aperture may open inadvertently during the operation of the apparatus.

The weight 34 may alternatively be held up by mechanical latches, two or more of which will support the weight at positions distributed around its periphery. The latch can be tripped by electrical, mechanical or pressure sensitive means as already described. The weight 34 need not be integral with the top end of the rod 33, and the rod may be returned to its upper position by a return spring.

An alternative form of the tubes is shown in FIG. 3. With reference to this figure, which illustrates the hopper and the upper end of the upper tube, the upper tube is formed from two concentric tubes 71, 72. The outer tube 71 is joined at its upper end to the wall of a chamber 73 in which is resiliently supported a hopper 74. The hopper is closed at its bottom by a conical valve 75, the lower end of which is adapted to slide up and down in the upper end of the tube 72. The valve 75 is attached to the lower end of a rod 76 which extends up through the hopper. A weight 77 is located at the upper end of the rod 76. The balls 30 are contained within the hopper 74 and downward movement of the rod 76 opens the valve 75 and allows the balls to pass down the annular channel between the inner and outer tubes. The lower tube, which extends into the core of the reactor, is also formed from two concentric tubes, and the balls pass from the upper annular channel to the lower annular channel between the two lower tubes.

In order to return the balls to the hopper while the apparatus is still in the reactor a pipe 78, which is connected to a high pressure gas supply is connected through an aperture 79 to the inner tube 72. By forcing gas under pressure down through the pipe 78 and the tube 72 the balls will be forced up the annular channel between tubes 71 and 72 and will return through the chamber 73 and will enter the hopper through the apertures at its top 81 and 82. The gas used to return the balls is conveniently the same as that used for cooling the reactor and therefore the high pressure gas supply can exhaust back into the reactor after it has caused the balls to return to the hopper.

In this modified form of the apparatus the weight is supported and controlled by any of the means already described.

In a modified form of the apparatus in which the holes 9 in the core of the reactor extend downwards to the diagrid 8, the balls 30 could be discharged from the bottom of the tube 22 by opening a remotely controlled valve. The balls will then fall out of the bottom of the core to waste or could be collected in a hopper.

FIGURE 4 illustrates an apparatus embodying a modified form of the invention and illustrates the layout of the components of the apparatus in their operational positions. The lower end A of the apparatus extends towards the bottom of a hole 9 in the core of the reactor, and at the point B the lower tube 116 of the ducting, which is preferably made of zirconium alloy, is joined to the upper tube. At the point C the upper tube is joined to the main part of the apparatus which is formed with an outer sleeve 135. At this point the tubes are enclosed in a stand pipe 3 which passes through the wall 5 of the pressure vessel and extends upwardly through a hole 2 in the biological shield 1. At the point D the main part of the apparatus includes the mechanism for tripping the apparatus and allowing the neutron absorbent material to fall into the lower tube. At the point E is located a drum onto which chains, rope or tape supporting the lower tube are wound, and F represents the charging floor.

FIGURE 5 illustrates in greater detail the lower end of the lower tube 116 which may be formed with a shock absorbing device. The device comprises a piston 117 onto the end of which the neutron absorbent material falls when the apparatus is tripped. The piston extends within the tube 116. The lower end of the tube 116 is closed with an end cap 119 and this end cap is screwed onto the lower end of the tube 116 by means of a collar 120. The upper end of the end cap 119 is formed with cutters 118. The lower end of the piston 117 normally rests on these cutters. When the neutron absorbent material falls down into the tube 116 it impinges upon the upper end of the piston and forces the piston downwards so that the cutters 118 cut into the softer metal of the piston. By this arrangement the shock of the impact of the neutron absorbent material is absorbed and there is no danger of damage to the lower tube 116. The end cap and the piston may be replaced by unscrewing the end 119 from the collar 120 when the apparatus has been withdrawn from within the reactor.

FIGURE 6 is in two parts, the lower part illustrating in greater detail the lower end of the upper tube of the apparatus and the upper part illustrating in greater detail the upper end of said upper tube. This upper tube includes the reservoir which contains the neutron absorbent material, illustrated for example as the boron shot 101. The shot is contained in an annular reservoir formed between an inner wall 102 and an outer wall 103. A valve member 104 closes the lower end of this reservoir and consists of a sleeve extending upwards within the lower end of the reservoir and having a lower end formed with an inner chamfered wall 105. The valve member is shown in the closed position in FIGURE 6 and is held in position by a supporting arrangement consisting of an outer sleeve 106 extending around the wall 103 and connected by a plurality of rods 107 to a lower support ring 108. This ring 108 is formed with a lower inwardly extending flange 109 on which rests an outwardly extending flange 110 of the valve member 104. An upper inwardly extending flange 111 on the ring 108 extends above the flange 110 and is spaced therefrom.

When the apparatus is tripped, the outer sleeve 106 falls and the flange 111 strikes the upper face of the flange 110. This will dislodge the valve member 104 and allow it to fall under its own weight. It will be appreciated that it is advisable to strike the valve member in case it is stuck in position. When the valve member 104 falls the chamfered face 105 will come below the lower edge 112 of the wall 102 and the valve member will reach the position 113 indicated by the dotted lines. When the valve is in such a position the boron shot will pass through the opening 114 into the lower tube 116. When the boron shot or other neutron absorbent material falls into the tube 116 it is in a position to absorb all the excess neutrons within the core and to shut down the reactor. It may be necessary, in order to shut down the reactor completely, to have more than one apparatus of the type described dispersed throughout the core of the reactor.

The lower tube 116 may be withdrawn into the upper tube by means of a chain or rope which is indicated at 121. The lower end of this chain is attached by a pin 122 to the member 123 closing the upper end of the tube 116. The lower tube 116 can be withdrawn into the upper tube whether or not the apparatus has been tripped. The upper tube is supported within the outer shell 135 of the apparatus. The lower end of the upper tube is closed with an annular member 131 having a chamfered lower face 132 and a central aperture through which the lower tube 116 extends. This face 132 is adapted to rest in a cooperating recess in the upper surface of the core and thereby to support the upper tube.

FIGURE 7 illustrates a modified form of the joint between the upper tube and the lower tube. It is often necessary to prevent the lower tube 116 from being blown into the upper tube by the pressure of the cooling fluid within the pressure vessel of the reactor and a mechanism of the type illustrated may be provided to prevent such an occurrence. As before, the lifting chain 121 is attached to a pin 122 which extends through apertures 124 in two lugs 125 extending from the upper end of the member 123. There is a clearance between the pin 122 and the walls of the apertures 124. The pin 122 is attached by an arm 126 to one end of a link 127, and the other end of the link 127 is attached to the lower end of a ratchet member 128. The upper end of this ratchet member is pivotally attached to the upper end of the wall of the tube 116. The ratchet member 128 is formed with a pawl 129 which normally engages below the lower edge 130 of the member 131. When the pawl is in this position it prevents the lower tube 116 from being forced upwards into the upper tube.

When the chain 121 is raised to initiate upward movement of the tube 116, the arm 126 is initially raised without any movement of the lower tube 116, due to the clearance between the pin 112 and the walls of the apertures 124. Upward movement of the arm 126 causes movement of the link 127 and this causes the ratchet member 128 to pivot inwardly so as to disengage the pawl 129 from the edge 130. When the pawl is disengaged from the edge 130 the pin 122 engages with the upper walls of the apertures 124 and further upward movement of the chain causes the lower tube to move upwardly. When the lower tube 116 is lowered into position the pawl 128 automatically engages with the edge 130.

The chamfered face of the member 131 can be formed with a recess 132', the sides of which abut against the upper face of the core of the reactor.

FIGURE 8 illustrates a drum 133 on which the chain 121 is wound. The drum is rotated by a hand-wheel located on the top of the apparatus. Alternatively the drum may be rotated by a suitable motor drive. The drum can be replaced by a sprocket having teeth which engage with the links of the chain, and the free end of the chain can be arranged to fall down through a suitable passage after passing over the sprocket.

FIGURE 9 illustrates diagrammatically a trip mechanism which can be used to control the apparatus. The upper end of the sleeve 106 which supports and controls the valve member 104 is formed with an arm 136 extending longitudinally. The upper end of this arm 136 is formed with a hook having a chamfered face 137. This hamfered face engages with a roller 139 attached to a cooperating chamfered face 139 on a second pivoted member 141. The member 141 is formed at its upper end with a hook having a flat face 142 on which is supported a roller 143. The roller 143 engages with a cooperating flat face 144 on an arm member 145. The member 145 is attached to a rod 146, which is free to rotate about a horizontal axis. The rod 146 is adapted to be rotated by the movement of any one of four trip devices 147, 148, 149 and 151. The linkages between these devices and the rod 146 are provided with lost motion links so that only one of the devices need be moved in order to rotate the rod.

Rotation of the rod 146 in an anti-clockwise direction, as viewed in FIGURE 9, disengages the face 144 from the roller 143 and allows the pivoted member 141 to rotate in a clockwise direction. This rotational movement causes the roller 138 to disengage from the face 137 and allows the arm 136 to fall. This causes the operating sleeve 106 to fall and open the valve member 104, in the manner already described.

FIGURE 10 illustrates one embodiment of the tripping mechanism, the tripping devices are illustrated at 147, 148, 149 and 151 and may be sensitive respectively to pressure changes or rates of changes of pressure, to temperature changes, to mechanical changes, or to electrical changes, for example. It will be seen that the linkage corresponds with the linkages illustrated in FIGURE 9 and provides for the rotation of the rod 146 in an anti-clockwise direction as viewed in FIGURE 10, which results in the release of the arm 136 causing the valve member to open. It will therefore be seen that the operation of any one of the trip devices will cause the valve closing the reservoir containing the steel balls to open, and will thus allow the balls to fall down the tubes which extend in the reactor core.

It will be appreciated that with the aparatus described with reference to FIGURES 4–10 the boron shot will fall into the lower tube when the apparatus is tripped. In order to re-cock the apparatus it will then be necessary to withdraw the lower tube 116 into the upper tube and return the shot to the reservoir between the walls 2 and 3. This may be done with the apparatus still located within the pressure vessel with suitable modifications to the apparatus, or the apparatus may be removed from the reactor and replaced after the boron shot has been returned to the reservoir. Alternatively the apparatus may be replaced immediately by another re-cocked apparatus.

The apparatus may be modified to include means for returning the shot to the reservoir without removing the apparatus from within the reactor, including any means already described above in this specification.

What I claim is:

Emergency apparatus for shutting down a nuclear reactor of the type having a core in which reactivity takes place, said apparatus comprising a reservoir for small particles of a material which readily absorbs thermal neutrons, said reservoir being disposed above said core, a valve at the lower end of said reservoir for controlling flow of said particles from said reservoir, an operating rod extending upwards from said valve and cooperatively connected with said valve to close said valve when said operating rod is in an upper position and to open said valve when said operating rod is in a lower position, a weight attached to the upper end of said rod above said reservoir, means responsive to operating conditions within said reactor for supporting said weight to hold said rod in said upper position and adapted to release said weight in response to emergency conditions in the reactor so that said weight falls thereby moving said rod into its lower position and striking said reservoir and opening said valve, ducting leading from said valve extending downward into said core for receiving said particles passing through said valve and conducting said particles into the portion of said ducting which extends within said core and means for withdrawing from said core the portion of said ducting which extends within said core.

References Cited in the file of this patent
UNITED STATES PATENTS 2,773,823     Goett _____ Dec. 11, 1956
2,852,458     Dietrich et al. _____ Sept. 16, 1958

OTHER REFERENCES

Research Reactors, published by USAEC (1955), pages 414–415.

NAA–SR–1049, Sodium Graphite Reactor Quarterly Progress Report, March–June 1954, issued September 1, 1954, declassified March 15, 1957, pages 86–89.